(12) United States Patent
Lin

(10) Patent No.: US 11,315,109 B2
(45) Date of Patent: Apr. 26, 2022

(54) TRANSACTION PROCESSING METHOD AND APPARATUS

(71) Applicant: Advanced New Technologies Co., Ltd., Grand Cayman (KY)

(72) Inventor: Mingshu Lin, Hangzhou (CN)

(73) Assignee: Advanced New Technologies Co., Ltd., Goerge Town (KY)

( * ) Notice: Subject to any disclaimer, the term of this patent is extended or adjusted under 35 U.S.C. 154(b) by 0 days.

(21) Appl. No.: 17/157,884

(22) Filed: Jan. 25, 2021

(65) Prior Publication Data

US 2021/0174359 A1 Jun. 10, 2021

Related U.S. Application Data

(63) Continuation of application No. PCT/CN2019/106890, filed on Sep. 20, 2019.

(30) Foreign Application Priority Data

Nov. 20, 2018 (CN) .......................... 201811385400.3

(51) Int. Cl.
*G06Q 20/38* (2012.01)
*G06Q 20/22* (2012.01)
(Continued)

(52) U.S. Cl.
CPC ..... *G06Q 20/3825* (2013.01); *G06Q 20/0658* (2013.01); *G06Q 20/223* (2013.01);
(Continued)

(58) Field of Classification Search
CPC ........... G06Q 20/3825; G06Q 20/0658; G06Q 20/223; G06Q 20/405; H04L 9/0643; H04L 9/3273; H04L 2209/38
(Continued)

(56) References Cited

U.S. PATENT DOCUMENTS 10,135,834 B1 11/2018 Galebach
10,915,891 B1 * 2/2021 Winklevoss ....... G06Q 20/3678
(Continued)

FOREIGN PATENT DOCUMENTS

CN 109697606 A * 4/2019

OTHER PUBLICATIONS

English translation of Chinese application CN 109697606 A, published Apr. 30, 2019 and filed Sep. 30, 2018, 12 pages (Year: 2018).*

(Continued)

*Primary Examiner* — James D Nigh
(74) *Attorney, Agent, or Firm* — Shun Yao; Yao Legal Services, Inc.

(57) ABSTRACT

During operation, a first node coupled to the blockchain sends a transaction confirmation request for a target transaction to a second node, the transaction confirmation request comprising transaction data associated with the target transaction. The first node receives a transaction confirmation response from the second node, the transaction confirmation response comprising a first data block comprising at least an identifier of the second node, first encoded transaction data generated based on a predetermined encoding scheme, and a first confirmation result. The first node generates a second data block comprising at least an identifier of the first node, second encoded transaction data generated based on the predetermined encoding scheme, and a second confirmation result; and in response to determining that each of the first confirmation result and the second confirmation result indicates that the target transaction is confirmed, stores the first data block and the second data block in the blockchain.

21 Claims, 12 Drawing Sheets

(51) Int. Cl.
  *G06Q 20/40* (2012.01)
  *G06Q 20/06* (2012.01)
  *H04L 9/06* (2006.01)
  *H04L 9/32* (2006.01)

(52) U.S. Cl.
  CPC ......... *G06Q 20/405* (2013.01); *H04L 9/0643* (2013.01); *H04L 9/3273* (2013.01); *H04L 2209/38* (2013.01)

(58) Field of Classification Search
  USPC ........................................................ 705/76
  See application file for complete search history.

(56) References Cited

U.S. PATENT DOCUMENTS

| | | |
|---|---|---|
| 2004/0024750 A1 | 2/2004 | Ulyanov |
| 2014/0245004 A1 | 8/2014 | Houston |
| 2018/0294966 A1 | 10/2018 | Hyun |
| 2019/0163912 A1 | 5/2019 | Kumar |
| 2019/0325473 A1* | 10/2019 | Swamidurai ........... G06Q 20/36 |
| 2019/0385215 A1* | 12/2019 | Ferenczi ............ G06Q 30/0633 |
| 2020/0128022 A1* | 4/2020 | Bleikertz .............. H04L 9/3297 |
| 2020/0193432 A1* | 6/2020 | Millar .................. G06Q 20/401 |

OTHER PUBLICATIONS

Tschorsch et al., "Bitcoin and Beyond: A Technical Survey on Decentralized Digital Currencies", IEEE Communications Surveys & Tutorials, vol. 18, No. 3, Third Quarter 2016, pp. 2084-2123 (Year: 2016).*

Boixo, S. et al. "Simulation of low-depth quantum circuits as complex undirected graphical models". Jan. 2018 , [online], [retrieved on Aug. 28, 2019], https://arxiv.org/pdf/1712.05384.pdf.

* cited by examiner

TRANSACTION PROCESSING METHOD AND APPARATUS

RELATED APPLICATION

Under 35 U.S.C. § 120 and § 365(c), this application is a continuation of PCT Application No. PCT/CN2019/106890, entitled "TRANSACTION PROCESSING METHOD AND APPARATUS," by inventor Mingshu Lin, filed 20 Sep. 2019, which claims priority to Chinese Patent Application No. 201811385400.3, filed on 20 Nov. 2018.

TECHNICAL FIELD

One or a plurality of embodiments of the present specification relate to the field of computers, and in particular, to a transaction processing method and apparatus.

BACKGROUND

Current transaction processing usually requires the participation of multiple parties. For example, a transaction may involve a transaction initiator and one or a plurality of transaction-related parties. With the development of the blockchain technology, the blockchain technology has been used in the process of transaction processing to store transaction data exchanged among multiple parties.

Once the transaction data is recorded on a blockchain network, repudiation or data tampering of individual blockchain members can be prevented, the basis of which is that everyone participates in recording and each blockchain member can get all data on the blockchain network. If the transaction data contains sensitive data (for example, user privacy data) and the sensitive data is written to the blockchain, the sensitive data will be leaked to all blockchain members.

As a result, there is a desire for an improved solution that does not cause leakage of sensitive data when transaction data is stored by using a blockchain network.

SUMMARY

One or a plurality of embodiments of the present specification describe a transaction processing method and apparatus, wherein sensitive data will not be leaked when transaction data is stored by using a blockchain network.

In a first aspect, one embodiment provides a system and method for processing a transaction based on blockchain. During operation, a first node coupled to the blockchain sends a transaction confirmation request for a target transaction to a second node coupled to the blockchain, the transaction confirmation request comprising transaction data associated with the target transaction. The first node receives a transaction confirmation response from the second node, the transaction confirmation response comprising a first data block comprising at least an identifier of the second node, first encoded transaction data generated based on a predetermined encoding scheme, and a first confirmation result. The first node generates a second data block comprising at least an identifier of the first node, second encoded transaction data generated based on the predetermined encoding scheme, and a second confirmation result; and in response to determining that each of the first confirmation result and the second confirmation result indicates that the target transaction is confirmed, stores the first data block and the second data block in the blockchain.

In a variation on this embodiment, in response to determining that each of the first confirmation result and the second confirmation result indicates that the target transaction is confirmed, the first node processes the target transaction by the blockchain.

In a further variation, processing the target transaction by the blockchain comprises: recording processing result information of the target transaction by the blockchain; and sending the processing result information of the target transaction to each node associated with the target transaction through the blockchain, thereby facilitating each node associated with the target transaction to process the target transaction.

In a variation on this embodiment, the transaction confirmation response further comprises first signature data of the first data block, the first signature data is computed by the second node based on a private key of the second node, and the first signature data is stored in the blockchain along with the first data block. The first node computes second signature data of the second data block based on a private key of the first node and stores the second signature data in the blockchain along with the second data block.

In a further variation, storing the first data block and the second data block in the blockchain further comprises storing the first data block, the first signature data, the second data block, and the second signature data in a same block.

In a further variation, the first node verifies the first signature data and the second signature data.

In a variation on this embodiment, storing the first data block and the second data block in the blockchain further comprises: checking whether the identifier of the second node and/or the identifier of the first node matches a member identifier on a transaction link of the target transaction; checking whether the first encoded transaction data matches the second encoded transaction data; and in response to the identifier of the second node and/or the identifier of the first node matching a member identifier on the transaction link and the first encoded transaction data matching the second encoded transaction data, storing the first data block and the second data block in the block chain.

In a second aspect, a transaction processing method is provided, the method is performed by a transaction initiator, and the method comprising:

sending a transaction confirmation request for a target transaction to each transaction-related party, the transaction confirmation request comprising transaction data;

receiving a transaction confirmation response from each of the transaction-related parties, the transaction confirmation response comprising a first data block and first signed data, wherein the first data block comprises first encoded data generated by encoding the transaction data using a preset encoding method by the transaction-related party, a first confirmation result, and an identifier of the transaction-related party; and the first signed data is obtained by performing signature computation on the first data block by using a private key of the transaction-related party;

encoding the transaction data using the preset encoding method to generate second encoded data; and generating a second confirmation result;

signing, by using a private key of the transaction initiator, a second data block comprising the second encoded data, the second confirmation result, and an identifier of the transaction initiator, so as to obtain second signed data; and storing the first data block and the first signed data of each of the transaction-related parties and the second data block and the second signed data of the transaction initiator through a blockchain network when determining that each of the first confirmation results and the second confirmation result are Confirmed.

In one possible implementation, the method further comprises:

processing the target transaction through the blockchain network when determining that each of the first confirmation result and the second confirmation result are Confirmed.

Further, processing the target transaction through the blockchain network comprises:

recording processing result information of the target transaction through the blockchain network; and sending the processing result information of the target transaction to each of the transaction-related parties through the blockchain network, so that each of the transaction-related parties processes the target transaction.

In a third aspect, a transaction processing method performed by a transaction-related party is provided, comprising:

receiving a transaction confirmation request for a target transaction from a transaction initiator, the transaction confirmation request comprising transaction data;

generating a first confirmation result according to the transaction data;

encoding the transaction data using a preset encoding method to generate first encoded data;

signing, by using a private key of the transaction-related party, a first data block comprising the first confirmation result and the first encoded data, so as to obtain first signed data; and sending a transaction confirmation response to the transaction initiator, the transaction confirmation response comprising the first data block and the first signed data, so that the transaction initiator stores the first data block and the first signed data of each of the transaction-related parties and data of the transaction initiator through a blockchain network when determining that a confirmation result of each of the transaction-related parties is Confirmed.

In one possible implementation, the method further comprises:

receiving processing result information of the target transaction from the blockchain network; and processing the target transaction according to the processing result information.

In a fourth aspect, a transaction processing method performed by a blockchain network is provided, comprising:

receiving, from a transaction initiator of a target transaction, a first data block and first signed data of each transaction-related party and a second data block and second signed data of the transaction initiator, wherein the first data block comprises first encoded data generated by encoding transaction data using a preset encoding method by the transaction-related party, a first confirmation result, and an identifier of the transaction-related party; the first signed data is obtained by performing signature computation on the first data block by using a private key of the transaction-related party; the second data block comprises second encoded data generated by encoding the transaction data using the preset encoding method by the transaction initiator, a second confirmation result, and an identifier of the transaction initiator; and the second signed data is obtained by performing signature computation on the second data block by using a private key of the transaction initiator; and storing the first data block and the first signed data of each of the transaction-related parties and the second data block and the second signed data of the transaction initiator.

In one possible implementation, after storing the first data block and the first signed data of each of the transaction-related parties and the second data block and the second signed data of the transaction initiator, the method further comprises:

processing the target transaction.

Further, processing the target transaction comprises:

recording processing result information of the target transaction; and sending the processing result information of the target transaction to each of the transaction-related parties, so that each of the transaction-related parties processes the target transaction.

Further, before storing the first data block and the first signed data of each of the transaction-related parties and the second data block and the second signed data of the transaction initiator, the method further comprises:

performing the following checks:

checking whether the identifier of the transaction-related party and/or the identifier of the transaction initiator matches a member identifier on a transaction link of the target transaction;

checking whether each of the first encoded data is the same as the second encoded data;

performing signature verification on the first data block and the first signed data of each of the transaction-related parties by using a public key of each of the transaction-related parties to verify whether the first data block matches the first signed data; and performing signature verification on the second data block and the second signed data of the transaction initiator by using a public key of the transaction initiator to verify whether the second data block matches the second signed data; and determining that check results of the checks are all Yes.

In one possible implementation, storing the first data block and the first signed data of each of the transaction-related parties and the second data block and the second signed data of the transaction initiator comprises:

storing the first data block and the first signed data of each of the transaction-related parties and the second data block and the second signed data of the transaction initiator in a block.

In a fifth aspect, a transaction processing apparatus is provided, the apparatus is deployed at a transaction initiator, comprising:

a sending unit, configured to send a transaction confirmation request for a target transaction to each transaction-related party, the transaction confirmation request comprising transaction data;

a receiving unit, configured to receive a transaction confirmation response from each of the transaction-related parties, the transaction confirmation response comprising a first data block and first signed data, wherein the first data block comprises first encoded data generated by encoding the transaction data using a preset encoding method by the transaction-related party, a first confirmation result, and an identifier of the transaction-related party; and the first signed data is obtained by performing signature computation on the first data block by using a private key of the transaction-related party;

an encoding unit, configured to encode the transaction data using the preset encoding method to generate second encoded data; and generate a second confirmation result;

a signing unit, configured to sign, by using a private key of the transaction initiator, a second data block comprising the second encoded data, the second confirmation result, and an identifier of the transaction initiator, so as to obtain second signed data; and a storage unit, configured to store the first data block and the first signed data of each of the transaction-related parties that are received by the receiving unit and the second data block and the second signed data of the transaction initiator through a blockchain network, when it is determined that each of the first confirmation results received by the receiving unit and the second confirmation result generated by the encoding unit are Confirmed.

In a sixth aspect, a transaction processing apparatus is provided, the apparatus being deployed at a transaction-related party and comprising:

a receiving unit, configured to receive a transaction confirmation request for a target transaction from a transaction initiator, the transaction confirmation request comprising transaction data;

a confirmation unit, configured to generate a first confirmation result according to the transaction data received by the receiving unit;

an encoding unit, configured to encode the transaction data received by the receiving unit using a preset encoding method to generate first encoded data;

a signing unit, configured to sign, by using a private key of the transaction-related party, a first data block comprising the first confirmation result and the first encoded data, so as to obtain first signed data; and a sending unit, configured to send a transaction confirmation response to the transaction initiator, the transaction confirmation response comprising the first data block and the first signed data, so that the transaction initiator stores the first data block and the first signed data of each of the transaction-related parties and data of the transaction initiator through a blockchain network when determining that a confirmation result of each of the transaction-related parties is Confirmed.

In a seventh aspect, a transaction processing apparatus is provided, the apparatus being deployed in a blockchain network and comprising:

a receiving unit, configured to receive, from a transaction initiator of a target transaction, a first data block and first signed data of each transaction-related party and a second data block and second signed data of the transaction initiator, wherein the first data block comprises first encoded data generated by encoding transaction data using a preset encoding method by the transaction-related party, a first confirmation result, and an identifier of the transaction-related party; the first signed data is obtained by performing signature computation on the first data block by using a private key of the transaction-related party; the second data block comprises second encoded data generated by encoding the transaction data using the preset encoding method by the transaction initiator, a second confirmation result, and an identifier of the transaction initiator; and the second signed data is obtained by performing signature computation on the second data block by using a private key of the transaction initiator; and a storage unit, configured to store the first data block and the first signed data of each of the transaction-related parties and the second data block and the second signed data of the transaction initiator that are received by the receiving unit.

In a eighth aspect, a computer-readable storage medium is provided, comprising a computer program stored thereon, wherein when executed in a computer, the computer program causes the computer to perform the method in the first aspect or the second aspect or the third aspect.

In an ninth aspect, a computing device is provided, comprising a memory and a processor, wherein the memory stores executable code, and when the processor executes the executable code, the method in the first aspect or the second aspect or the third aspect is implemented.

Through the method and apparatus provided in the embodiments of the present specification, a transaction initiator sends transaction data to a transaction-related party, thereby facilitating the transaction-related party in confirming the transaction, but the transaction-related party does not directly return the transaction data and a confirmation result to the transaction initiator; instead, the transaction-related party encodes the transaction data to obtain encoded data and returns the encoded data and the confirmation result to the transaction initiator, and subsequently, the transaction initiator does not directly store the transaction data and the confirmation result in a blockchain network, but stores the encoded data and the confirmation result as a data block in the blockchain network, and blockchain members do not know the transaction data, so that sensitive data is not leaked when the transaction data is stored using the blockchain network.

BRIEF DESCRIPTION OF THE DRAWINGS

In order to illustrate the technical solutions in the embodiments of the present invention more clearly, the accompanying drawings required to be used in the description of the embodiments will be introduced briefly below. Apparently, the accompanying drawings described below are merely some embodiments of the present invention, and those of ordinary skill in the art can also obtain other accompanying drawings according to these accompanying drawings without making creative efforts.

DETAILED DESCRIPTION OF THE EMBODIMENTS

The solutions provided in the present specification are described below with reference to the accompanying drawings.

Figure 1:
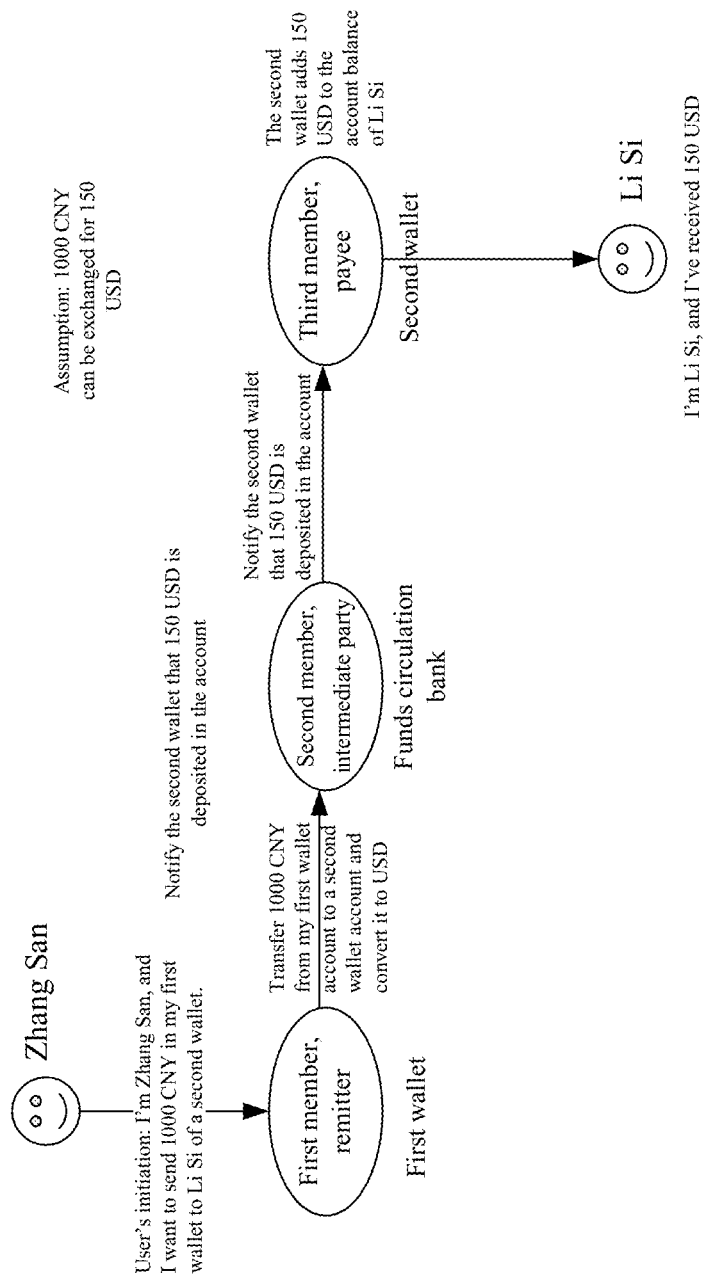
FIG. 1 is a schematic diagram illustrating an implementation scenario of an embodiment disclosed in the present specification.

FIG. 1 is a schematic diagram illustrating an implementation scenario of an embodiment disclosed in the present specification. The implementation scenario involves a fund transaction, which is specifically a transfer transaction. FIG. 1 illustrates a simplified transfer process, where Zhang San sends, through a first wallet, money to Li Si of a second wallet. Referring to FIG. 1, the flow direction of the fund is: first wallet (first member)→fund circulation bank (second member)→second wallet (third member). Blockchain ledger is introduced in order to guarantee the reliability of fund flow, simplify reconciliation, shorten the transfer period, and so on.

Figure 2:
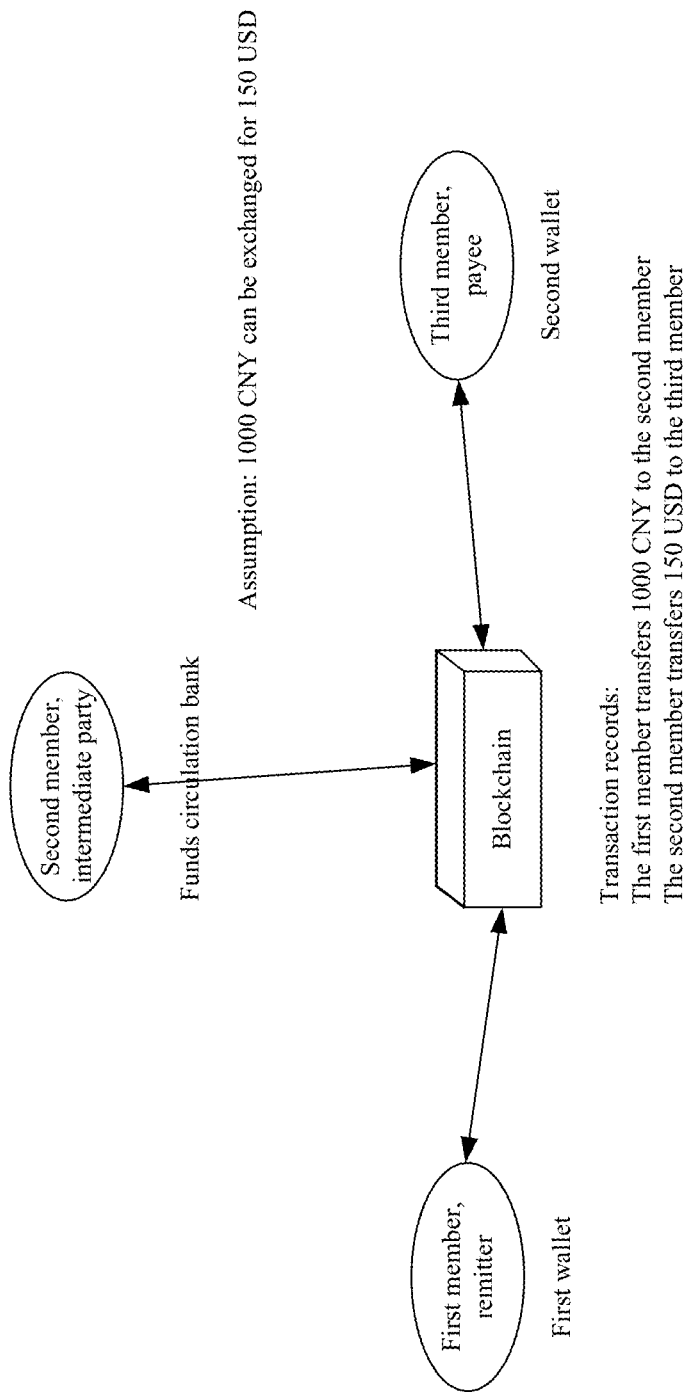
FIG. 2 is a schematic diagram illustrating a blockchain ledger implementation scenario corresponding to the implementation scenario shown in FIG. 1.

FIG. 2 is a schematic diagram illustrating a blockchain ledger implementation scenario corresponding to the implementation scenario shown in FIG. 1. The implementation scenario involves data recording through blockchain in a transfer process. Referring to FIG. 2, after joining the blockchain, a first member initiates a transaction through a first wallet, and the blockchain records transaction data and sends the recorded transaction data to all members. Financial regulation requires that each participant of a fund link needs to perform risk scanning, for example, anti-money laundering, anti-terrorism financing, etc. Such risk scanning often requires sensitive data (for example, an identity card number) of a user. Therefore, risk scanning needs to be initiated in the transaction process, and any one of the first member, a second member, and a third member may initiate risk scanning. The embodiment of the present specification merely uses the first member being a transaction initiator as an example for description, but it should be understood that the transaction initiator is not limited to the first member. After the first member initiates risk scanning, members in a fund link perform risk scanning and feed back scanning results. In order to prevent risks such as repudiation of individual members, detailed information and scanning results of risk scanning of the various members need to be written to the blockchain. However, the detailed information of risk scanning often contains a lot of privacy information, and such information will be leaked if written to the blockchain.

In view of the aforementioned problem, in the embodiment of the present specification, during transaction processing, transaction data stored on the blockchain after being encoded, thus realizing desensitization of transaction information, so that members on a transaction link approve the transaction and cannot repudiate the transaction, and do not leak the transaction information.

It should be noted that the implementation scenario involves a scenario in which multiple members participate in a blockchain transaction and the members are required to approve the transaction (e.g., based on risk scanning result). The multiple members may be only two members, for example, one transaction initiator and one transaction-related party; the multiple members may also be three or more members, for example, one transaction initiator and a plurality of transaction-related parties.

In addition, the transaction may be a fund transaction or may be a non-fund transaction.

For example, the non-fund transaction may be a car rental transaction. In the transaction, an intermediate party may not exist, the first member may be an intermediary/platform, and the second member is a rental company of a specific car provider. The first member submits information of an actual renter in plaintext to the second member for confirming whether renting can be performed, and then the second member encodes the information and signs the encoded data and a confirmation result together and returns them to the first member. Finally, the first member places the desensitized information on the blockchain.

It can be understood that the transaction processing method in the embodiment of the present specification can be applied to many implementation scenarios, as long as multiple members participate in a blockchain transaction and the members are required to approve the transaction, which will not be described herein again.

Figure 3:
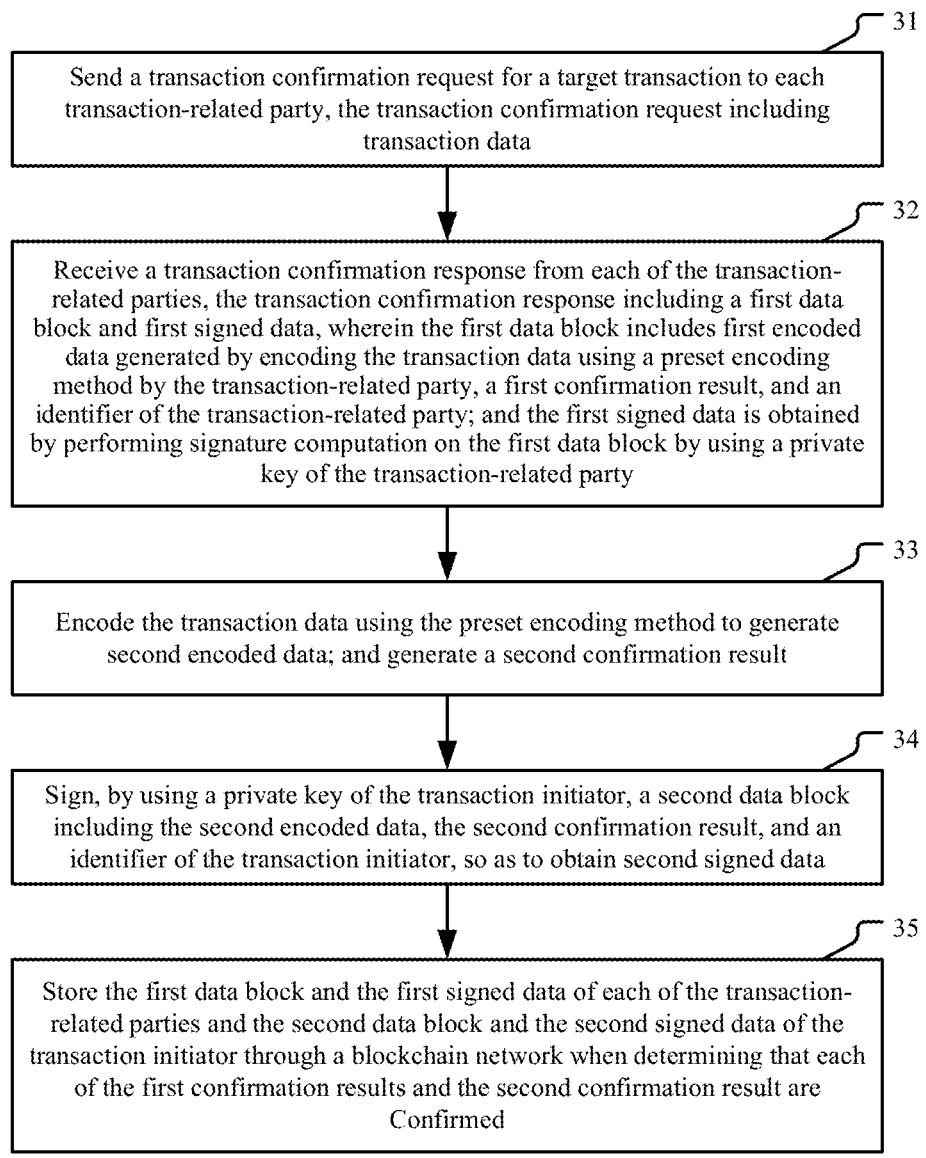
FIG. 3 is a flowchart of a transaction processing method according to an embodiment.

FIG. 3 is a flowchart of a transaction processing method according to an embodiment. The method is performed by a transaction initiator, for example, the first member in the scenario shown in FIG. 2. As shown in FIG. 3, the transaction processing method in the embodiment includes the following steps: step 31: sending a transaction confirmation request for a target transaction to each transaction-related party, the transaction confirmation request including transaction data; step 32: receiving a transaction confirmation response from each of the transaction-related parties, the transaction confirmation response including a first data block and first signed data, wherein the first data block includes first encoded data generated by encoding the transaction data using a preset encoding method by the transaction-related party, a first confirmation result, and an identifier of the transaction-related party; and the first signed data is obtained by performing signature computation on the first data block by using a private key of the transaction-related party; step 33: encoding the transaction data using the preset encoding method to generate second encoded data; and generating a second confirmation result; step 34: signing, by using a private key of the transaction initiator, a second data block including the second encoded data, the second confirmation result, and an identifier of the transaction initiator, so as to obtain second signed data; and step 35: storing the first data block and the first signed data of each of the transaction-related parties and a second data block and second signed data of the transaction initiator through a blockchain network when determining that each of the first confirmation results and the second confirmation result are Confirmed. The specific execution method of the aforementioned steps is described below.

First, at step 31, a transaction confirmation request for a target transaction is sent to each transaction-related party, the transaction confirmation request including transaction data.

In embodiment of the present specification, the content of the transaction data is not limited. For example, the transaction data may include but is not limited to privacy information of a user, such as the name, identity card number, age etc.

Next, at step 32: a transaction confirmation response from each of the transaction-related parties is received, the transaction confirmation response including a first data block and first signed data, where the first data block includes first encoded data generated by encoding the transaction data using a preset encoding method by the transaction-related party, a first confirmation result, and an identifier of the transaction-related party; and the first signed data is obtained by performing signature computation on the first data block by using a private key of the transaction-related party.

It can be understood that the number of the transaction-related parties may be multiple or may be one.

The preset encoding method may be any encoding method in which original data cannot be easily obtained by encoding the data, for example, a hash encoding method.

The first confirmation result is used for indicating whether the transaction-related party approves the target transaction (e.g., based on the outcome of a locally performed risk scanning operation).

The signed data can be used for proving the identity, each member of the blockchain has a member ID and a pair of public and private keys, where the public key is public, and the private keys can be used for proving the identity. For example, A may sign data D using a private key to obtain a signature string S; A sends data D and signature string S to B; B performs signature verification on data D and signature string S through a public key of A, and if they match, it indicates that the data received by B really comes from A.

Afterwards, at step 33, the transaction data is encoded using the preset encoding method to generate second encoded data; and a second confirmation result is generated.

It can be understood that the transaction initiator and the transaction-related party have the same manner of generating encoded data; theoretically, the first encoded data and the second encoded data should also be the same, and whether they are the same may be subsequently checked by the blockchain network.

The second confirmation result is used for indicating whether the transaction initiator approves the target transaction.

Then, at step 34, by using a private key of the transaction initiator, a second data block including the second encoded data, the second confirmation result, and an identifier of the transaction initiator is signed, so as to obtain second signed data.

The manner of the signature computation has been described previously, and will not be described herein again.

Finally, at step 35, the first data block and the first signed data of each of the transaction-related parties and the second data block and the second signed data of the transaction initiator are stored through the blockchain network, when it is determined that each of the first confirmation results and the second confirmation result are Confirmed.

In an example, the target transaction may further be processed through the blockchain network when it is determined that each of the first confirmation results and the second confirmation result are Confirmed. For example, processing result information of the target transaction is recorded through the blockchain network; and the processing result information of the target transaction is sent to each of the transaction-related parties through the blockchain network, so that each of the transaction-related parties processes the target transaction.

Through the method provided in the embodiment of the present specification, a transaction initiator sends transaction data to a transaction-related party, thereby facilitating the transaction-related party in confirming the transaction, but the transaction-related party does not directly return the transaction data and a confirmation result to the transaction initiator; instead, the transaction-related party encodes the transaction data to obtain encoded data and returns the encoded data and the confirmation result to the transaction initiator, and subsequently, the transaction initiator does not directly store the transaction data and the confirmation result in a blockchain network, but stores the encoded data and the confirmation result as a data block in the blockchain network, and blockchain members do not know the transaction data, so that sensitive data is not leaked when the transaction data is stored using the blockchain network.

Figure 4:
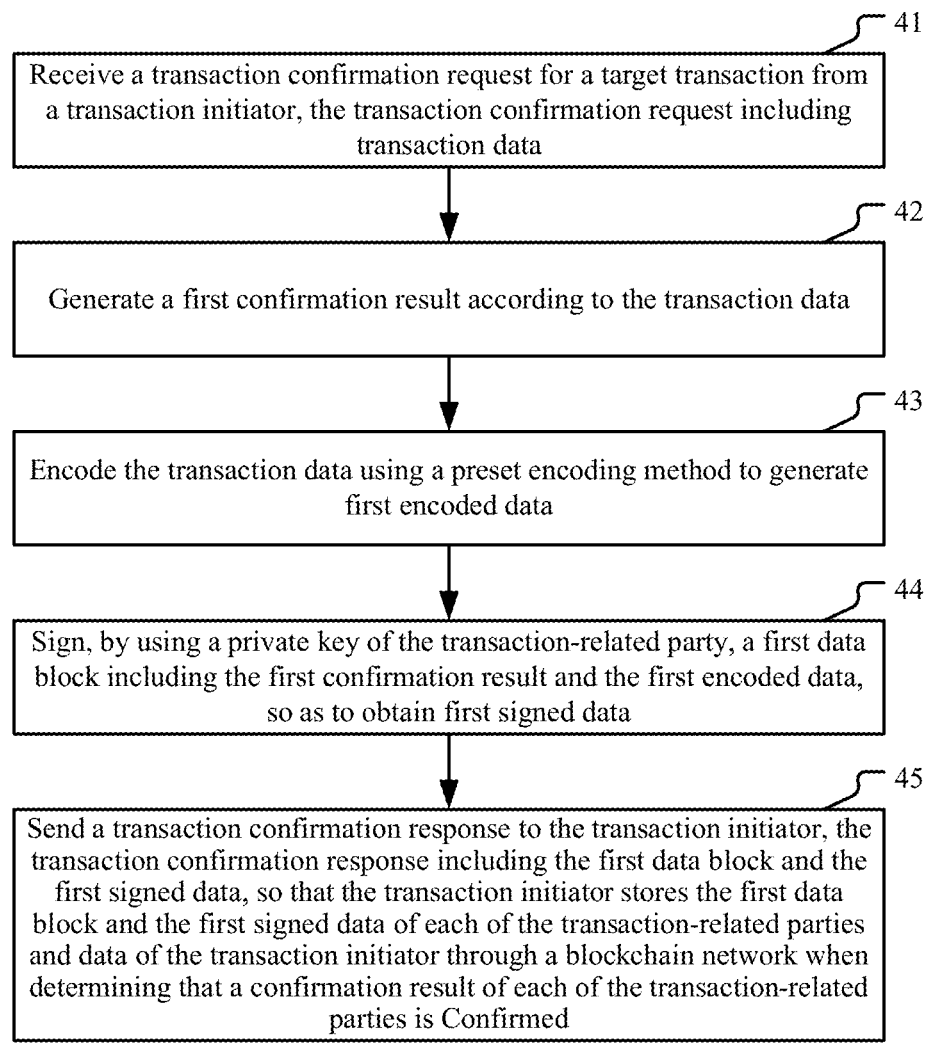
FIG. 4 is a flowchart of a transaction processing method according to another embodiment.

FIG. 4 is a flowchart of a transaction processing method according to another embodiment. The method is performed by a transaction-related party, for example, the second member or the third member in the scenario shown in FIG. 2. As shown in FIG. 4, the transaction processing method in the embodiment includes the following steps: step 41: receiving a transaction confirmation request for a target transaction from a transaction initiator, the transaction confirmation request including transaction data; step 42: generating a first confirmation result according to the transaction data; step 43: encoding the transaction data using a preset encoding method to generate first encoded data; step 44: signing, by using a private key of the transaction-related party, a first data block including the first confirmation result and the first encoded data, so as to obtain first signed data; and step 45: sending a transaction confirmation response to the transaction initiator, the transaction confirmation response including the first data block and the first signed data, so that the transaction initiator stores the first data block and the first signed data of each of the transaction-related parties and data of the transaction initiator through a blockchain network when determining that a confirmation result of each of the transaction-related parties is Confirmed. The specific execution method of the aforementioned steps is described below.

First, at step 41, a transaction confirmation request for a target transaction from a transaction initiator is received, the transaction confirmation request including transaction data.

In the embodiment of the present specification, the content of the transaction data is not limited. For example, the transaction data may include but is not limited to privacy information of a user, such as the name, identity card number, age etc.

Next, at step 42, a first confirmation result according to the transaction data is generated.

The first confirmation result is used for indicating whether the transaction-related party approves the target transaction.

Afterwards, at step 43: the transaction data is encoded using a preset encoding method to generate first encoded data.

It can be understood that the transaction initiator and the transaction-related party have the same manner of generating encoded data; theoretically, the first encoded data and the second encoded data should also be the same, and whether they are the same may be subsequently checked by the blockchain network.

Then, at step 44, by using a private key of the transaction-related party, a first data block including the first confirmation result and the first encoded data is signed, so as to obtain first signed data.

The manner of the signature computation has been described previously, and will not be described herein again.

Finally, at step 45, a transaction confirmation response is sent to the transaction initiator, the transaction confirmation response including the first data block and the first signed data, so that the transaction initiator stores the first data block and the first signed data of each of the transaction-related parties and data of the transaction initiator through a blockchain network when determining that a confirmation result of each of the transaction-related parties is Confirmed.

The data of the transaction initiator includes the second data block and the second signed data of the transaction initiator. Reference may be made to the corresponding description in FIG. 3 for details.

In an example, the method further includes:

receiving processing result information of the target transaction from the blockchain network; and processing the target transaction according to the processing result information.

Through the method provided in the embodiment of the present specification, a transaction-related party receives transaction data from a transaction initiator, thereby facilitating the transaction-related party in confirming the transaction, but the transaction-related party does not directly return the transaction data and a confirmation result to the transaction initiator; instead, the transaction-related party encodes the transaction data to obtain encoded data and returns the encoded data and the confirmation result to the transaction initiator, and subsequently, the transaction initiator does not directly store the transaction data and the confirmation result in a blockchain network, but stores the encoded data and the confirmation result as a data block in the blockchain network, and blockchain members do not know the transaction data, so that sensitive data is not leaked when the transaction data is stored using the blockchain network.

Figure 5:
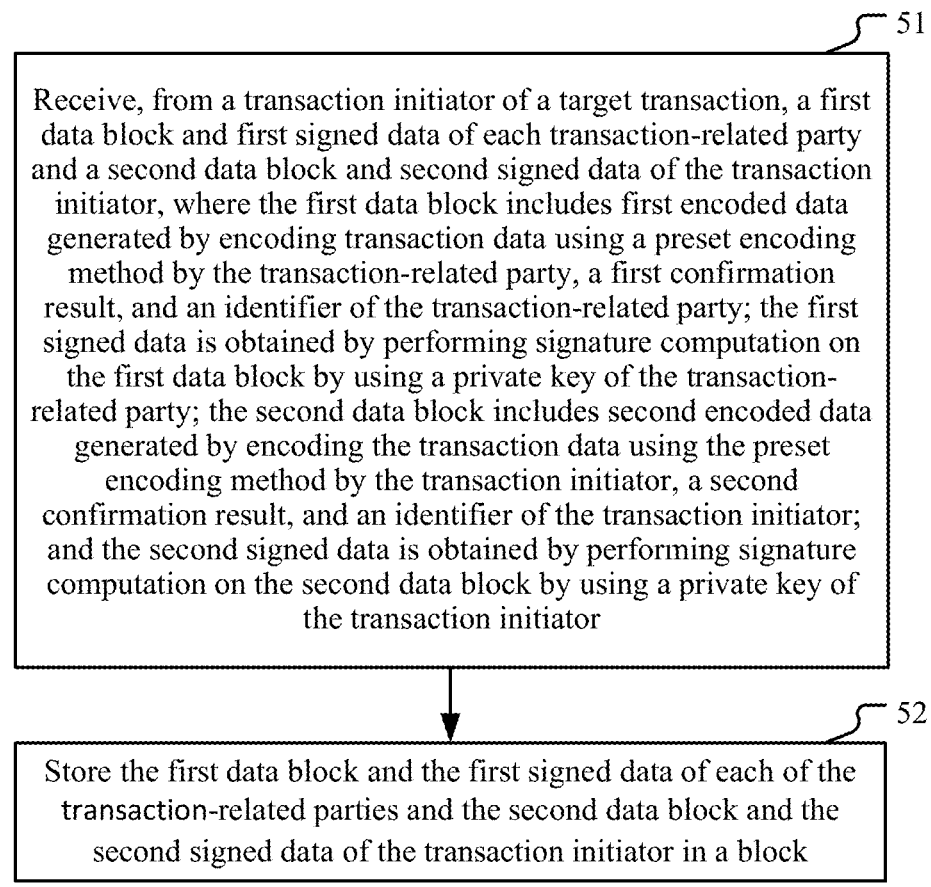
FIG. 5 is a flowchart of a transaction processing method according to another embodiment.

FIG. 5 is a flowchart of a transaction processing method according to another embodiment. The method is performed by a blockchain network, and the blockchain network may be called blockchain for short, for example, the blockchain in the scenario shown in FIG. 2. As shown in FIG. 5, the transaction processing method in the embodiment includes the following steps:

step 51: receive, from a transaction initiator of a target transaction, a first data block and first signed data of each transaction-related party and a second data block and second signed data of the transaction initiator, where the first data block includes first encoded data generated by encoding transaction data using a preset encoding method by the transaction-related party, a first confirmation result, and an identifier of the transaction-related party; the first signed data is obtained by performing signature computation on the first data block by using a private key of the transaction-related party; the second data block includes second encoded data generated by encoding the transaction data using the preset encoding method by the transaction initiator, a second confirmation result, and an identifier of the transaction initiator; and the second signed data is obtained by performing signature computation on the second data block by using a private key of the transaction initiator.

It can be understood that the transaction initiator and the transaction-related party may join the blockchain network in advance to become members of the blockchain network.

Step 52: store the first data block and the first signed data of each of the transaction-related parties and the second data block and the second signed data of the transaction initiator.

In an example, after step 52, the method may further include processing the target transaction. For example, processing result information of the target transaction is recorded; and the processing result information of the target transaction is sent to each of the transaction-related parties, so that each of the transaction-related parties processes the target transaction.

In an example, before step 52, the method may further include:

performing the following checks:

checking whether the identifier of the transaction-related party and/or the identifier of the transaction initiator matches a member identifier on a transaction link of the target transaction;

checking whether each of the first encoded data is the same as the second encoded data;

performing signature verification on the first data block and the first signed data of each of the transaction-related parties by using a public key of each of the transaction-related parties to verify whether the first data block matches the first signed data; and performing signature verification on the second data block and the second signed data of the transaction initiator by using a public key of the transaction initiator to verify whether the second data block matches the second signed data; and determining that check results of the checks are all Yes.

As an example, step 52 may be specifically storing the first data block and the first signed data of each of the transaction-related parties and the second data block and the second signed data of the transaction initiator in a block.

Through the method provided in the embodiment of the present specification, a blockchain network does not directly receive transaction data and a confirmation result from a transaction initiator, but receives encoded data and the confirmation result and stores the encoded data and the confirmation result as a data block in the blockchain network, and blockchain members do not know the transaction data, so that sensitive data is not leaked when the transaction data is stored using the blockchain network.

Figure 6:
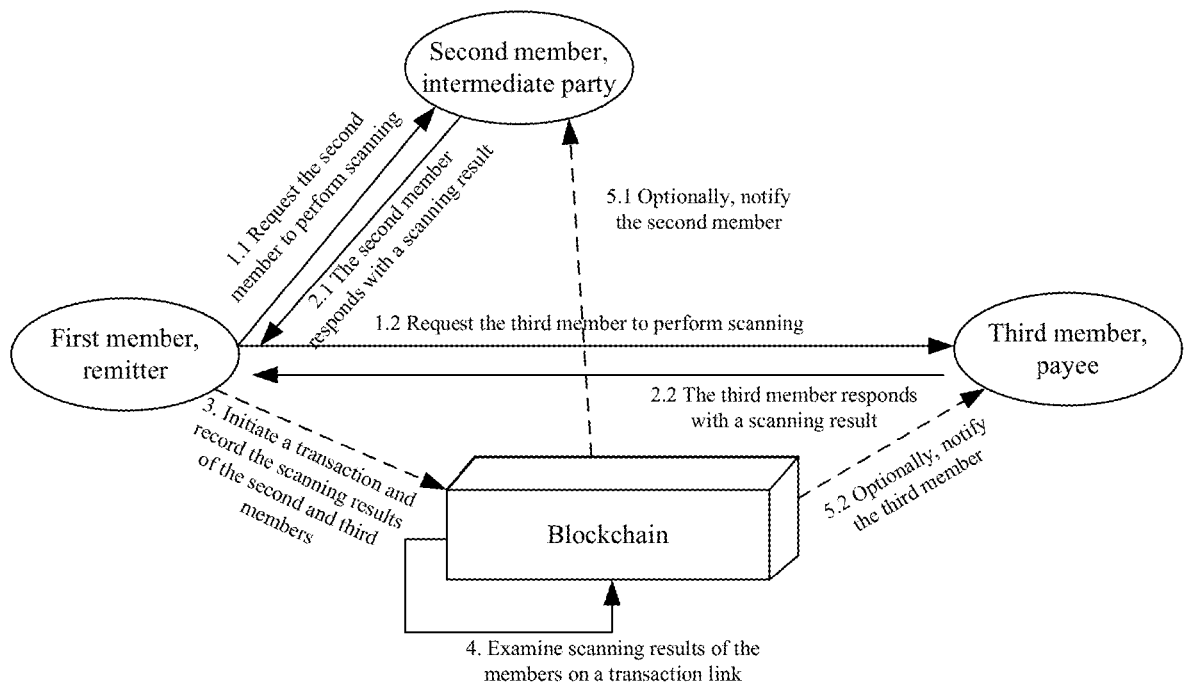
FIG. 6 is a schematic diagram illustrating interactions among members during transaction processing according to an embodiment.
Figure 7:
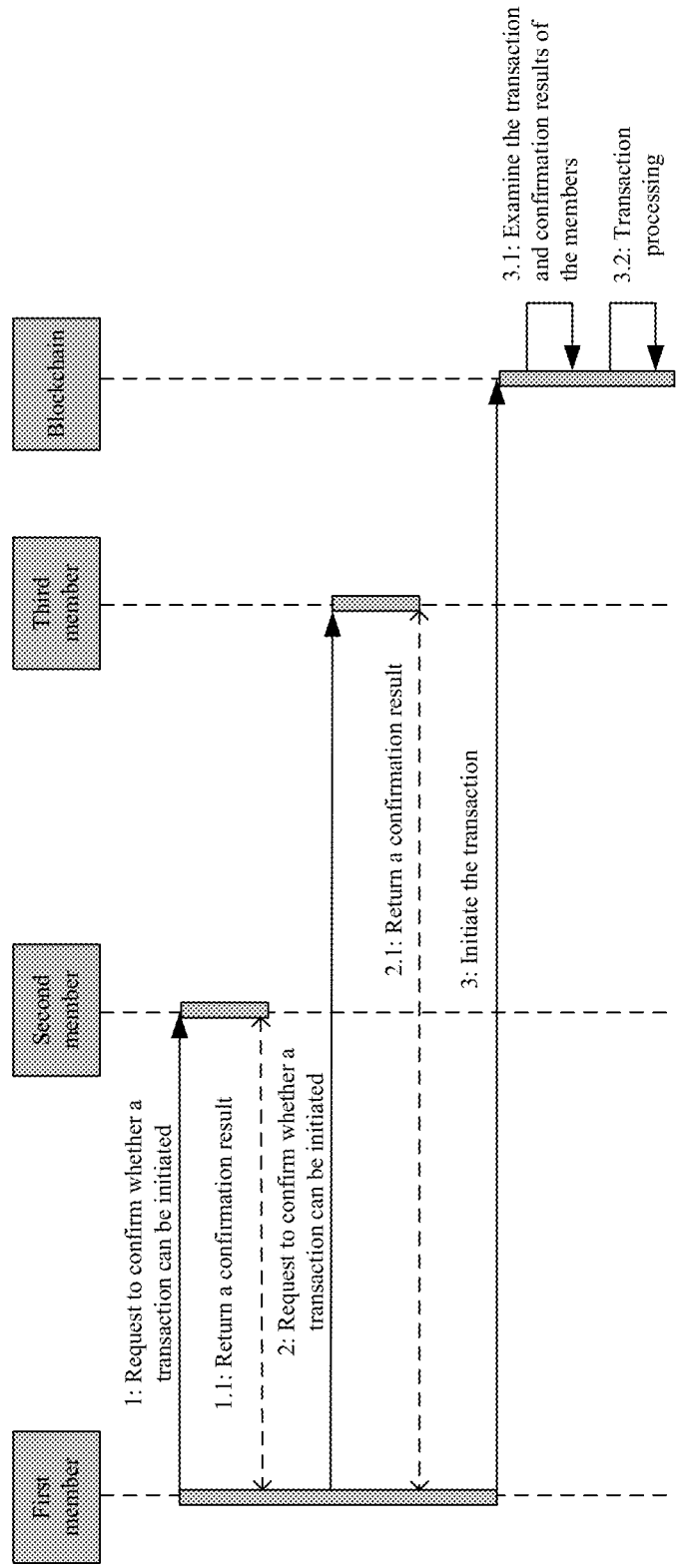
FIG. 7 is a sequence diagram of transaction processing according to an embodiment.

FIG. 6 is a schematic diagram illustrating interactions among members during transaction processing according to an embodiment. FIG. 7 is a sequence diagram of transaction processing according to an embodiment. Referring to FIG. 6 or FIG. 7, a transaction link involves a first member, a second member, and a third member, where the first member is a transaction initiator, the second member and the third member are transaction-related parties, and the conduction of a transaction needs to obtain approval of the first member, the second member, and the third member.

Figure 8:
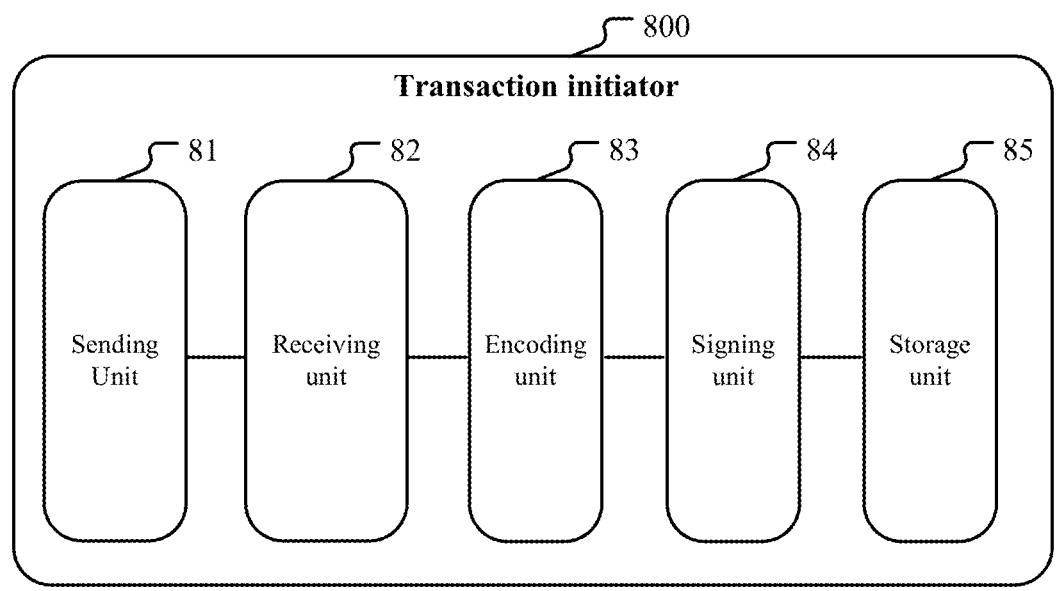
FIG. 8 is a schematic block diagram of a transaction processing apparatus according to an embodiment.

In an embodiment according to another aspect, a transaction processing apparatus is further provided, the apparatus being deployed at a transaction initiator. FIG. 8 is a schematic block diagram of a transaction processing apparatus according to an embodiment. As shown in FIG. 8, the apparatus 800 includes:

a sending unit 81, configured to send a transaction confirmation request for a target transaction to each transaction-related party, the transaction confirmation request including transaction data;

a receiving unit 82, configured to receive a transaction confirmation response from each of the transaction-related parties, the transaction confirmation response including a first data block and first signed data, wherein the first data block includes first encoded data generated by encoding the transaction data using a preset encoding method by the transaction-related party, a first confirmation result, and an identifier of the transaction-related party; and the first signed data is obtained by performing signature computation on the first data block by using a private key of the transaction-related party;

an encoding unit 83, configured to encode the transaction data using the preset encoding method to generate second encoded data; and generate a second confirmation result;

a signing unit 84, configured to sign, by using a private key of the transaction initiator, a second data block including the second encoded data, the second confirmation result, and an identifier of the transaction initiator, so as to obtain second signed data; and a storage unit 85, configured to store, through a blockchain network, the first data block and the first signed data of each of the transaction-related parties that are received by receiving unit 82 and the second data block and the second signed data of the transaction initiator, when it is determined that each of the first confirmation results received by receiving unit 82 and the second confirmation result generated by encoding unit 83 are Confirmed.

Optionally, as an embodiment, the apparatus further includes:

a processing unit, configured to process the target transaction through the blockchain network when it is determined that each of the first confirmation results received by receiving unit 82 and the second confirmation result are Confirmed.

Further, the processing unit is specifically configured to:

record processing result information of the target transaction through the blockchain network; and send the processing result information of the target transaction to each of the transaction-related parties through the blockchain network, so that each of the transaction-related parties processes the target transaction.

Through the apparatus provided in the embodiment of the present specification, sending unit 81 sends transaction data to a transaction-related party, thereby facilitating the transaction-related party in confirming the transaction, but the transaction-related party does not directly return the transaction data and a confirmation result to receiving unit 82; instead, the transaction-related party encodes the transaction data to obtain encoded data and returns the encoded data and the confirmation result to receiving unit 82, and subsequently, storage unit 85 does not directly store the transaction data and the confirmation result in a blockchain network, but stores the encoded data and the confirmation result as a data block in the blockchain network, and blockchain members do not know the transaction data, so that sensitive data is not leaked when the transaction data is stored using the blockchain network.

Figure 9:
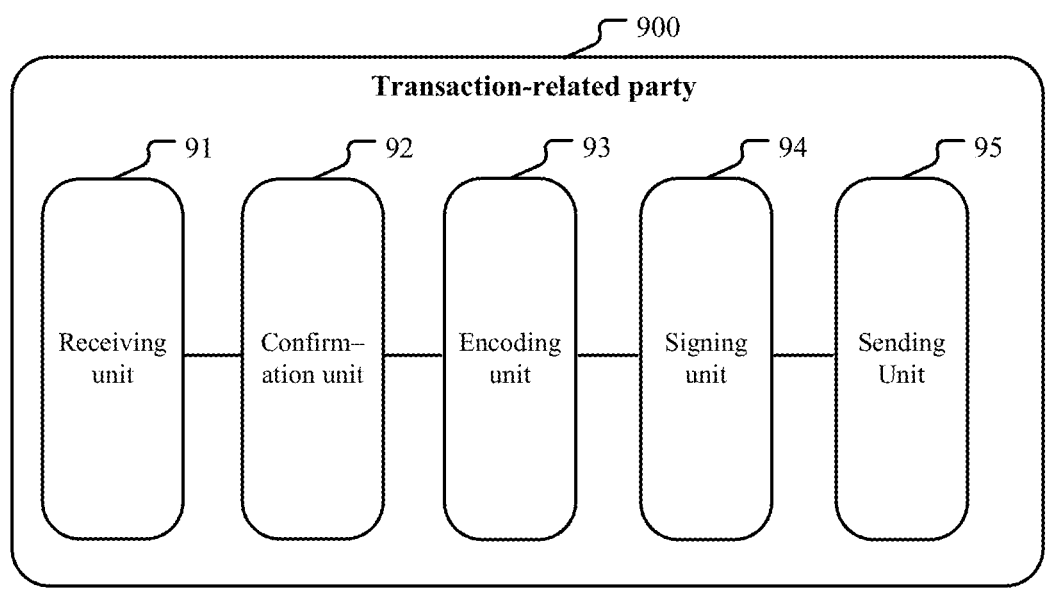
FIG. 9 is a schematic block diagram of a transaction processing apparatus according to another embodiment.

In an embodiment according to another aspect, a transaction processing apparatus is further provided, the apparatus being deployed at a transaction-related party. FIG. 9 is a schematic block diagram of a transaction processing apparatus according to another embodiment. As shown in FIG. 9, apparatus 900 includes:

a receiving unit 91, configured to receive a transaction confirmation request for a target transaction from a transaction initiator, the transaction confirmation request including transaction data;

a confirmation unit 92, configured to generate a first confirmation result according to the transaction data received by receiving unit 91;

an encoding unit 93, configured to encode the transaction data received by receiving unit 91 using a preset encoding method to generate first encoded data;

a signing unit 94, configured to sign, by using a private key of the transaction-related party, a first data block including the first confirmation result and the first encoded data, so as to obtain first signed data; and a sending unit 95, configured to send a transaction confirmation response to the transaction initiator, the transaction confirmation response including the first data block and the first signed data, so that the transaction initiator stores the first data block and the first signed data of each of the transaction-related parties and data of the transaction initiator through a blockchain network when determining that a confirmation result of each of the transaction-related parties is Confirmed.

Optionally, as an embodiment, receiving unit 91 is further configured to receive processing result information of the target transaction from the blockchain network; and the apparatus further includes:

a processing unit, configured to process the target transaction according to the processing result information received by receiving unit 91.

Through the apparatus provided in the embodiment of the present specification, receiving unit 91 receives transaction data from a transaction initiator, thereby facilitating confirmation unit 92 in confirming the transaction, but sending unit 95 does not directly return the transaction data and a confirmation result to the transaction initiator; instead, the transaction-related party encodes the transaction data to obtain encoded data and returns the encoded data and the confirmation result to the transaction initiator, and subsequently, the transaction initiator does not directly store the transaction data and the confirmation result in a blockchain network, but stores the encoded data and the confirmation result as a data block in the blockchain network, and blockchain members do not know the transaction data, so that sensitive data is not leaked when the transaction data is stored using the blockchain network.

Figure 10:
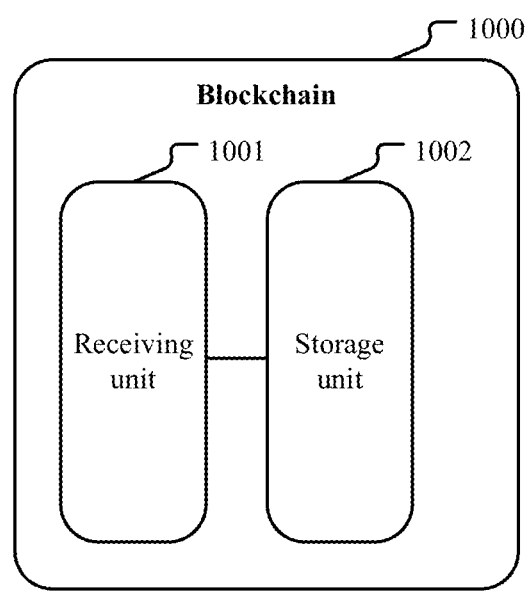
FIG. 10 is a schematic block diagram of a transaction processing apparatus according to another embodiment.

In an embodiment according to another aspect, a transaction processing apparatus is further provided, the apparatus being deployed in a blockchain network, and specifically, deployed on a node of the blockchain network, which may be called blockchain for short. FIG. 10 is a schematic block diagram of a transaction processing apparatus according to another embodiment. As shown in FIG. 10, apparatus 1000 includes:

a receiving unit 1001, configured to receive, from a transaction initiator of a target transaction, a first data block and first signed data of each transaction-related party and a second data block and second signed data of the transaction initiator, wherein the first data block includes first encoded data generated by encoding transaction data using a preset encoding method by the transaction-related party, a first confirmation result, and an identifier of the transaction-related party; the first signed data is obtained by performing signature computation on the first data block by using a private key of the transaction-related party; the second data block includes second encoded data generated by encoding the transaction data using the preset encoding method by the transaction initiator, a second confirmation result, and an identifier of the transaction initiator; and the second signed data is obtained by performing signature computation on the second data block by using a private key of the transaction initiator; and a storage unit 1002, configured to store the first data block and the first signed data of each of the transaction-related parties and the second data block and the second signed data of the transaction initiator that are received by receiving unit 1001.

Optionally, as an embodiment, the apparatus further includes:

a processing unit, configured to process the target transaction after storage unit 1002 stores the first data block and the first signed data of each of the transaction-related parties and the second data block and the second signed data of the transaction initiator.

Further, the processing unit is specifically configured to:

record processing result information of the target transaction; and send the processing result information of the target transaction to each of the transaction-related parties, so that each of the transaction-related parties processes the target transaction.

Further, the apparatus further includes:

a checking unit, configured to perform the following checks before storage unit 1002 stores the first data block and the first signed data of each of the transaction-related parties and the second data block and the second signed data of the transaction initiator:

checking whether the identifier of the transaction-related party and/or the identifier of the transaction initiator matches a member identifier on a transaction link of the target transaction;

checking whether each of the first encoded data is the same as the second encoded data;

performing signature verification on the first data block and the first signed data of each of the transaction-related parties by using a public key of each of the transaction-related parties to verify whether the first data block matches the first signed data; and performing signature verification on the second data block and the second signed data of the transaction initiator by using a public key of the transaction initiator to verify whether the second data block matches the second signed data; and a determining unit, configured to determine that checking results of the checks obtained by the checking unit are all Yes.

Optionally, as an embodiment, storage unit 1002 is specifically configured to store, in a block, the first data block and the first signed data of each of the transaction-related parties and the second data block and the second signed data of the transaction initiator that are received by receiving unit 1001.

Through the apparatus provided in the embodiment of the present specification, receiving unit 1001 does not directly receive transaction data and a confirmation result from a transaction initiator, but receives encoded data and the confirmation result, and storage unit 1002 stores the encoded data and the confirmation result as a data block in a blockchain network, and blockchain members do not know the transaction data, so that sensitive data is not leaked when the transaction data is stored using the blockchain network.

Figure 11:
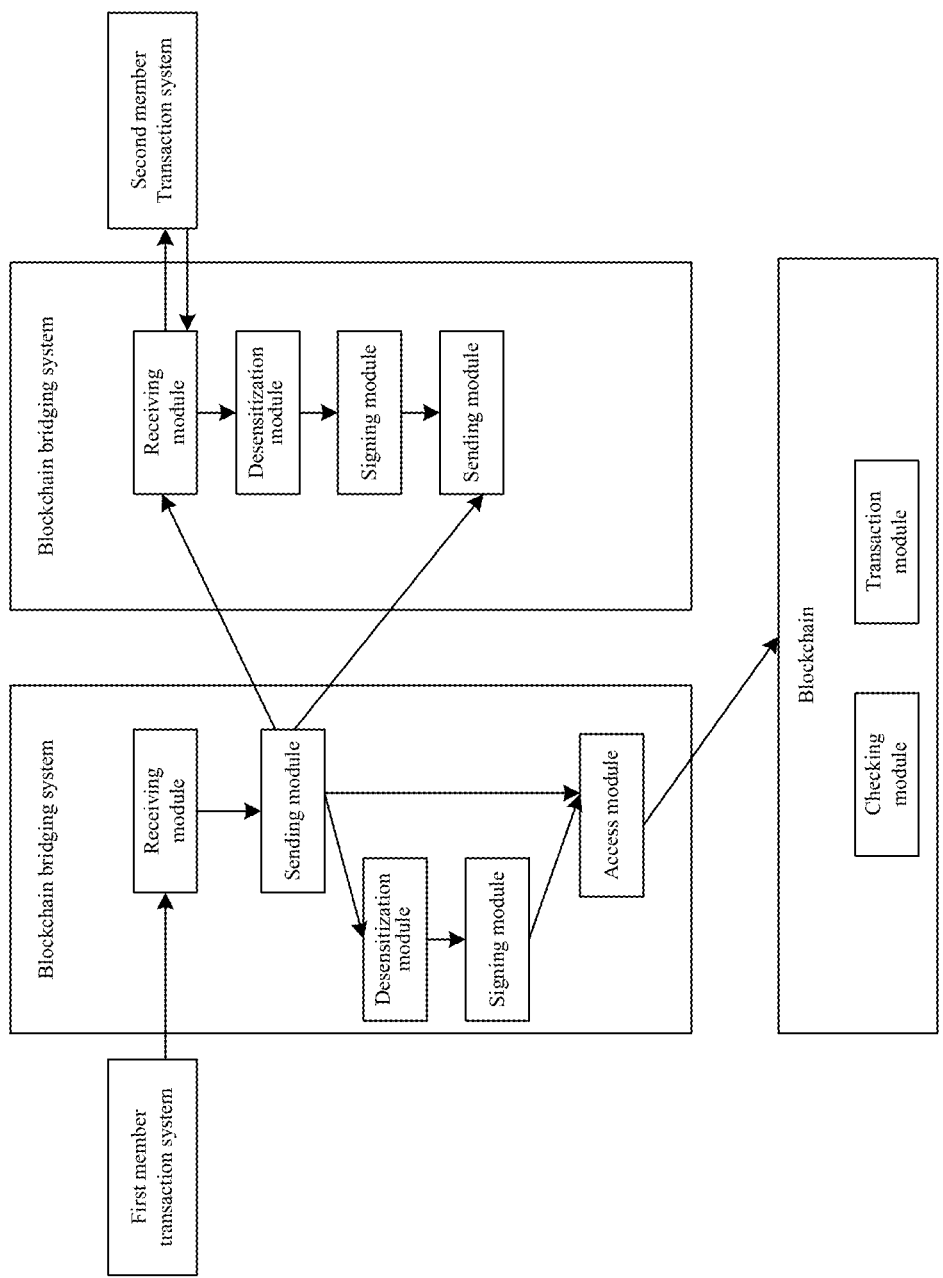
FIG. 11 is a schematic block diagram of a transaction processing system according to an embodiment.

In an embodiment according to another aspect, a transaction processing system is further provided, the system including a first member transaction system, a second member transaction system, blockchain bridging systems, and blockchain. FIG. 11 is a schematic block diagram of a transaction processing system according to an embodiment. As shown in FIG. 11, the processing process of the system includes:

First, a first member (i.e., a transaction initiator) initiates a transaction confirmation request to a blockchain bridging system of the first member, where data in the request includes detail data agreed upon in a transaction (hereinafter collectively referred to as BIZ_DATA).

Next, after a receiving module of the blockchain bridging system of the first member receives the request, the data is sent to all members on a transaction link in an agreed format by a sending module, where the sent data includes BIZ_DATA.

Afterwards, after receiving the request, a receiving module of a blockchain bridging system of a second member (if transaction-related parties further include a third member, the third member uses the same processing logic as the second member) forwards the data to the second member's transaction system to perform transaction confirmation, where the received data includes BIZ_DATA. After performing confirmation, the second member returns a confirmation result (hereinafter collectively referred to as RESULT) to the receiving module of the blockchain bridging system. The receiving module transfers the BIZ_DATA and the result to a desensitization module for processing.

Then, the desensitization module of the blockchain bridging system of the second member performs hash processing (other encoding methods may also be adopted) on the BIZ_DATA to calculate a corresponding hash code. Then, the hash code and RESULT are transferred to a signing module.

Afterwards, the signing module of the blockchain bridging system of the second member uses the hash code, RESULT, and a preset member ID of the second member as a data block (hereinafter collectively referred to as CHECK_RESULT) according to an agreed format, and then calculates a signature (hereinafter collectively referred to as SIGNATURE) using a private key.

Then, a sending module of the blockchain bridging system of the second member returns the CHECK_RESULT and SIGNATURE to the first member.

Then, after receiving CHECK_RESULT and SIGNATURE returned by all members on the transaction link, the sending module of the blockchain bridging system of the first member parses and examines transaction confirmation results (the RESULT) in all of the received CHECK_RESULT to see whether they are all Confirmed, and if yes, an access module is further invoked.

Then, the access module of the blockchain bridging system of the first member sends CHECK_RESULT and SIGNATURE of all the members on the transaction link to the blockchain for processing.

Then, a checking module in the blockchain performs the following checks: parsing all CHECK_RESULT, where parsed data includes the hash codes, RESULT, and member IDs; checking whether all the parsed member IDs match all the member IDs on the transaction link; checking whether the hash codes of every members are completely the same; examining each pair of CHECK_RESULT and SIGNATURE, obtaining a public key of a corresponding member through a member ID, and performing signature verification on CHECK_RESULT and SIGNATURE using the public to verify whether they match.

Finally, the blockchain can invoke a transaction module of the blockchain to perform transaction processing after the checks are all completed.

In an embodiment according to another aspect, a computer-readable storage medium is further provided, having a computer program stored thereon, where when executed in a computer, the computer program causes the computer to perform the method described with reference to any one of FIG. 3 to FIG. 5.

In an embodiment according to yet another aspect, a computing device is further provided, including a memory and a processor, where the memory stores executable code, and when the processor executes the executable code, the method described with reference to any one of FIG. 3 to FIG. 5 is implemented.

Figure 12:
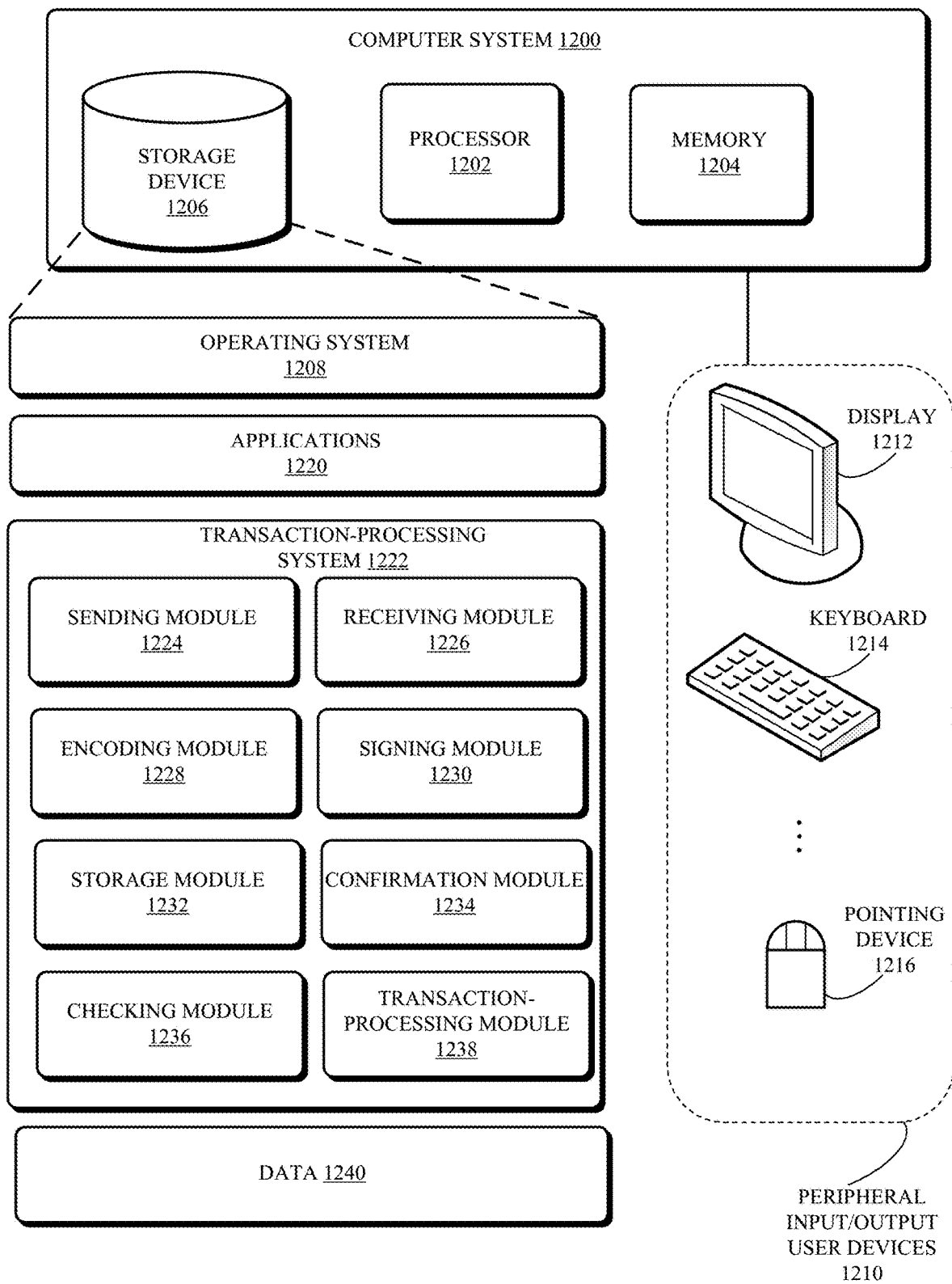
FIG. 12 illustrates an exemplary computer and communication system for processing transactions, according to one embodiment.

FIG. 12 illustrates an exemplary computer and communication system for processing transactions, according to one embodiment. In FIG. 12, computer system 1200 can include a processor 1202, a memory 1204, and a storage device 1206. Furthermore, computer system 1200 can be coupled to peripheral input/output (I/O) user devices 1210, e.g., a display device 1212, a keyboard 1214, and a pointing device 1216. Storage device 1206 can store an operating system 1208, one or more applications 1220, a transaction-processing system 1222, and data 1240. In general, computer system 1200 can be a transaction initiator, a transaction-related party, or a general node on the block chain.

Applications 1220 can include instructions, which can be loaded from storage device 1206 into memory 1204 and executed by processor 1202. As a result, computer system 1200 can perform specific functions provided by applications 1220.

Transaction-processing system 1222 can include instructions, which when executed by computer system 1200, can cause computer system 1200 or processor 1202 to perform methods and/or processes described in this disclosure. Specifically, transaction-processing system 1222 can include instructions for sending a transaction confirmation request or response (sending module 1224), instructions for receiving a transaction confirmation request or response (receiving module 1226), instructions for encoding the transaction data (encoding module 1228), instructions for signing the encoded transaction data (signing module 1230), instructions for storing the encrypted and signed transaction data (storage module 1232), instructions for generating a transaction confirmation result indicating whether the transaction is approved (confirmation module 1234), instructions for determining the validity of the transaction data by performing various checks before the transaction data being stored (checking module 1236), and instructions for processing the transaction (transaction-processing module 1238).

In some embodiments, applications 1220 and the various modules in transaction-processing system 1222, such as modules 1224, 1226, 1228, 1230, 1232, 1234, 1236, and 1238 can be partially or entirely implemented in hardware and can be part of processor 1202. Further, in some embodiments, the system may not include a separate processor and memory. Instead, in addition to performing their specific tasks, modules 1220, 1224, 1226, 1228, 1230, 1232, 1234, 1236, and 1238, either separately or in concert, may be part of general- or special-purpose computation engines.

Figure 13:
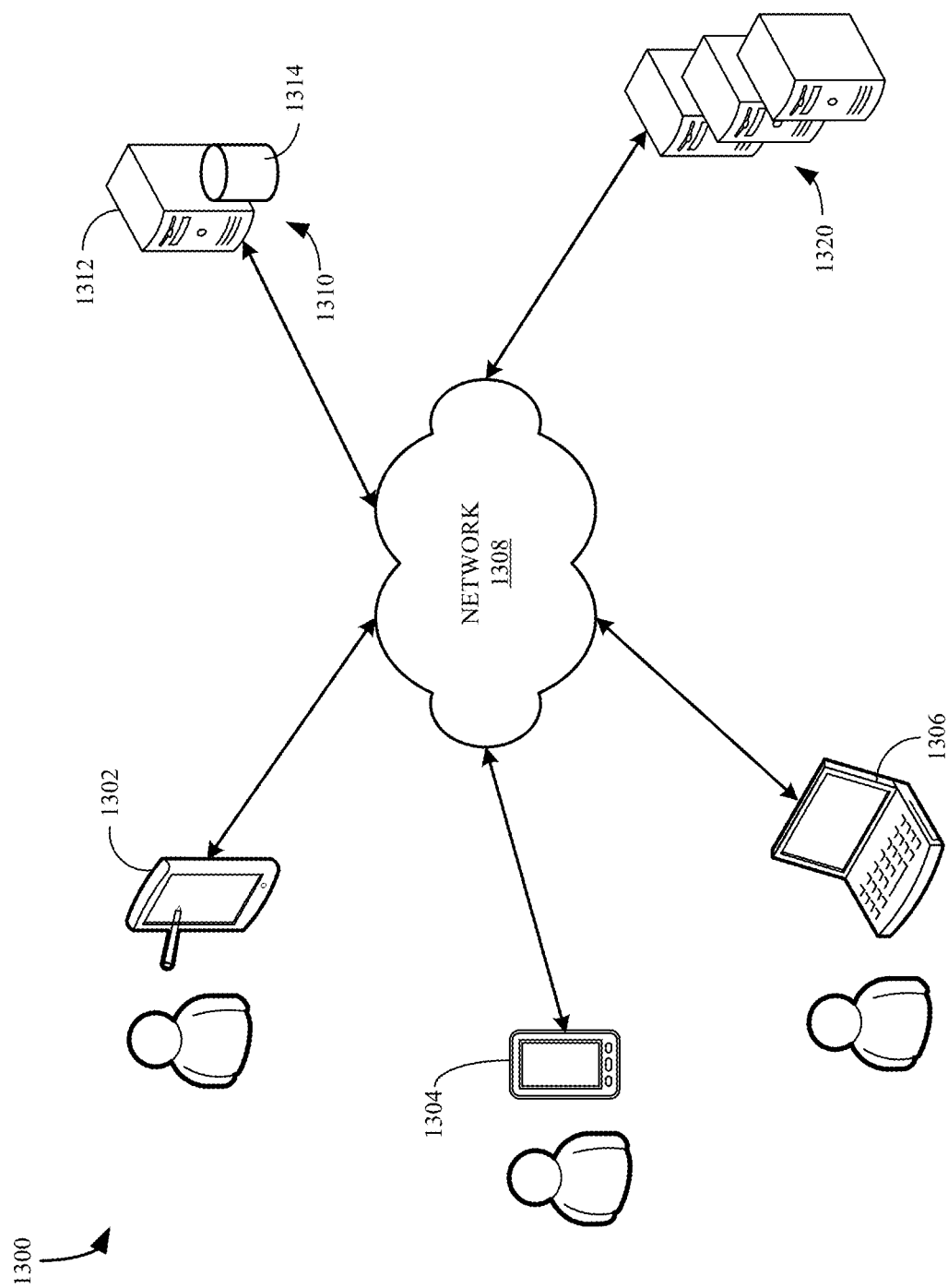
FIG. 13 illustrates an exemplary network environment for implementing the disclosed technology, in accordance with some embodiments described herein.

FIG. 13 illustrates an exemplary network environment for implementing the disclosed technology, in accordance with some embodiments described herein. A network environment 1300 includes a number of electronic devices 1302, 1304 and 1306 communicably connected to a server 1310 by a network 1308. One or more remote servers 1320 are further coupled to the server 1310 and/or the one or more electronic devices 1302, 1304 and 1306.

In some exemplary embodiments, electronic devices 1302, 1304 and 1306 can be computing devices such as laptop or desktop computers, smartphones, PDAs, wearable devices (e.g., smartwatches, smartglasses, etc.) portable media players, tablet computers, televisions or other displays with one or more processors coupled thereto or embedded therein, or other appropriate computing devices that can be used for displaying a web page or web application. In one example, the electronic devices 1302, 1304 and 1306 store a user agent such as a browser or application. In the example of FIG. 13, electronic device 1302 is depicted as a tablet computer, electronic device 1304 is depicted as a smartphone, and electronic device 1306 is depicted as a laptop computer.

Server 1310 includes a processing device 1312 and a data store 1314. Processing device 1312 executes computer instructions stored in data store 1314, for example, to assist in scheduling a customer-initiated service or a service-provider-initiated service between a service provider and a customer at electronic devices 1302, 1304 and 1306 during a service scheduling process.

In some exemplary aspects, server 1310 can be a single computing device such as a computer server. In other embodiments, server 1310 can represent more than one computing device working together to perform the actions of a server computer (e.g., cloud computing). The server 1310 may host the web server communicably coupled to the browser at the client device (e.g., electronic devices 1302, 1304 or 1306) via network 1308. In one example, the server 1310 may host a client application for scheduling a customer-initiated service or a service-provider-initiated service between a service provider and a customer during a service scheduling process. Server 1310 may further be in communication with one or more remote servers 1320 either through the network 1308 or through another network or communication means.

The one or more remote servers 1320 may perform various functionalities and/or storage capabilities described herein with regard to the server 1310, either alone or in combination with server 1310. Each of the one or more remote servers 1320 may host various services. For example, servers 1320 may host services providing information regarding one or more suggested locations such as web pages or websites associated with the suggested locations, services for determining the location of one or more users or establishments, search engines for identifying results for a user query, one or more user review or query services, or one or more other services providing information regarding one or more establishments, customers and/or reviews or feedback regarding the establishments.

Each of the one or more remote servers 1320 can be a single computing device such as a computer server or can represent more than one computing device working together to perform the actions of a server computer (e.g., cloud computing). In one embodiment server 1310 and one or more remote servers 1320 may be implemented as a single server or a cluster of servers. In one example, server 1310 and one or more remote servers 1320 may communicate through the user agent at the client device (e.g., electronic devices 1302, 1304 or 1306) via network 1308.

Users may interact with the system hosted by server 1310, and/or one or more services hosted by remote servers 1320, through a client application installed at the electronic devices 1302, 1304, and 1306. Alternatively, the user may interact with the system through a web-based browser application at the electronic devices 1302, 1304, and 1306. Communication among client devices 1302, 1304, 1306 and the system, and/or one or more services, may be facilitated through a network (e.g., network 1308).

Communication among the client devices 1302, 1304, 1306, server 1310 and/or one or more remote servers 1320 may be facilitated through various communication protocols. In some aspects, client devices 1302, 1304, 1306, server 1310 and/or one or more remote servers 1320 may communicate wirelesssly through a communication interface (not shown), which may include digital signal processing circuitry where necessary. The communication interface may provide for communications under various modes or protocols, including Global System for Mobile communication (GSM) voice calls; Short Message Service (SMS), Enhanced Messaging Service (EMS), or Multimedia Messaging Service (MMS) messaging; Code Division Multiple Access (CDMA); Time Division Multiple Access (TDMA); Personal Digital Cellular (PDC); Wideband Code Division Multiple Access (WCDMA); CDMA2000; or General Packet Radio System (GPRS), among others. For example, the communication may occur through a radio-frequency transceiver (not shown). In addition, short-range communication may occur, including via the use of a Bluetooth-enabled device, Wi-Fi®, or another such transceiver.

Network 1308 can include, for example, any one or more of a personal area network (PAN), a local area network (LAN), a campus area network (CAN), a metropolitan area network (MAN), a wide area network (WAN), a broadband network (BBN), the Internet, and the like. Further, network 1308 can include, but is not limited to, any one or more of the following network topologies, including a bus network, a star network, a ring network, a mesh network, a star-bus network, a tree or hierarchical network, and the like.

Those skilled in the art should realize that in the aforementioned one or plurality of examples, the functions described in the present invention may be implemented by hardware, software, or firmware, or any combination thereof. When implemented by software, these functions may be stored in a computer-readable medium, or transmitted as one or a plurality of instructions or as one or a plurality of pieces of code in the computer-readable medium.

The objectives, the technical solutions, and the beneficial effects of the present invention are further described in detail in the foregoing specific implementation. It should be understood that the foregoing descriptions are merely specific implementation of the present invention, and are not intended to limit the protection scope of the present invention. Any modification, equivalent replacement, and improvement made on the basis of the technical solutions of the present invention shall fall within the protection scope of the present invention.

What is claimed is:

1. A computer-executed method for processing a transaction based on blockchain, the method comprising:
   sending, by a first node associated with the blockchain, a transaction confirmation request for a target transaction to a second node associated with the blockchain, wherein the transaction confirmation request comprises transaction data associated with the target transaction, and wherein the transaction data comprises identifying information of the first node's user associated with the target transaction;
   receiving a transaction confirmation response from the second node, wherein the transaction confirmation response comprises a first data block and a first signature, wherein the first data block comprises an identifier of the second node, a first piece of encoded transaction data generated by encoding the transaction data based on a predetermined encoding scheme, and a first confirmation result, wherein the first signature corresponds to a signature computed on the first data block using a private key of the second node, and wherein the first confirmation result indicates approval of the target transaction by the second node based on the identifying information;
   generating, by the first node, a second data block comprising at least an identifier of the first node, a second piece of encoded transaction data generated by encoding the transaction data based on the predetermined encoding scheme, and a second confirmation result indicating approval of the target transaction by the first node;
   computing, by the first node, a second signature, which is computed on the second data block using a private key of the first node; and
   in response to both the first and second confirmation results indicating that the target transaction is confirmed:
      storing the first and second data blocks in the blockchain, thereby preventing the transaction data from being leaked to other members in the blockchain; and
      storing the first and second signatures in the blockchain along with the first and second data blocks, respectively.

2. The method according to claim 1, further comprising:
   in response to both the first and second confirmation results indicating that the target transaction is confirmed, processing the target transaction for the blockchain.

3. The method according to claim 2, wherein processing the target transaction further comprises:
   recording processing result information of the target transaction; and
   sending the processing result information to a respective node associated with the target transaction through the blockchain, thereby allowing the node to process the target transaction.

4. The method according to claim 1, wherein storing the first and second data blocks in the blockchain further comprises:
   storing the first data block, the first signature, the second data block, and the second signature in a same block.

5. The method according to claim 1, further comprising verifying the first signature and the second signature.

6. The method according to claim 1, wherein storing the first and second data blocks in the blockchain further comprises:
   checking whether the identifier of the second node and the identifier of the first node are associated with the target transaction;
   checking whether the first piece of encoded transaction data matches the second piece of encoded transaction data; and
   in response to the identifier of the second node and the identifier of the first node being associated with the target transaction and the first piece of encoded transaction data matching the second piece of encoded transaction data, storing both the first data block and the second data block in the blockchain.

7. A computer-executed method for processing a transaction based on blockchain, the method comprising:
   receiving, by a first node associated with the blockchain, a transaction confirmation request for a target transaction from a second node associated with the blockchain, wherein the transaction confirmation request comprises transaction data associated with the target transaction, and wherein the transaction data comprises identifying information of the second node's user associated with the target transaction;
   generating a first confirmation result based on the transaction data, wherein the first confirmation result indicates approval of the target transaction by the first node based on the identifying information;
   generating a first piece of encoded transaction data by encoding the transaction data using a predetermined encoding scheme;
   computing a first signature, which is computed on the first data block using a private key of the first node;
   sending, by the first node, a transaction confirmation response to the second node, wherein the transaction confirmation response comprises a first data block and the first signature, wherein the first data block comprises an identifier of the first node, the first encoded transaction data, and the first confirmation result, thereby facilitating the second node in storing the first data block in the blockchain in response to determining that the target transaction is confirmed based on the first confirmation result and preventing the transaction data from being leaked to other members in the blockchain.

8. The method according to claim 7, further comprising:
receiving result information of the target transaction from the blockchain; and
processing the target transaction according to the result information.

9. The method according to claim 7, further comprising:
storing the first signature in the blockchain along with the first data block.

10. A computer system, comprising
a processor;
a storage device coupled to the processor and storing instructions, which when executed by the processor cause the processor to perform a method for processing a transaction based on blockchain, the method comprising:
sending, by a first node associated with the blockchain, a transaction confirmation request for a target transaction to a second node associated with the blockchain, wherein the transaction confirmation request comprises transaction data associated with the target transaction, and wherein the transaction data comprises identifying information of the first node's user associated with the target transaction;
receiving a transaction confirmation response from the second node, wherein the transaction confirmation response comprises a first data block and a first signature, wherein the first data block comprises an identifier of the second node, a first piece of encoded transaction data generated by encoding the transaction data based on a predetermined encoding scheme, and a first confirmation result, wherein the first signature corresponds to a signature computed on the first data block using a private key of the second node, and wherein the first confirmation result indicates approval of the target transaction by the second node based on the identifying information;
generating, by the first node, a second data block comprising at least an identifier of the first node, a second piece of encoded transaction data generated by encoding the transaction data based on the predetermined encoding scheme, and a second confirmation result indicating approval of the target transaction by the first node;
computing, by the first node, a second signature, which is computed on the second data block using a private key of the first node; and
in response to both the first and second confirmation results indicating that the target transaction is confirmed:
storing the first and second data blocks in the blockchain, thereby preventing the transaction data from being leaked to other members in the blockchain; and
storing the first and second signatures in the blockchain along with the first and second data blocks, respectively.

11. The computer system according to claim 10, wherein the method further comprises:
in response to determining that both the first and second confirmation results indicating that the target transaction is confirmed, processing the target transaction for the blockchain.

12. The computer system according to claim 11, wherein processing the target transaction further comprises:
recording result information of the target transaction; and
sending the result information to a respective node associated with the target transaction through the blockchain, thereby allowing the node to process the target transaction.

13. The computer system according to claim 10, wherein storing the first and second data blocks in the blockchain further comprises:
storing the first data block, the first signature, the second data block, and the second signature in a same block.

14. The computer system according to claim 10, wherein the method further comprising verifying the first signature and the second signature.

15. The computer system according to claim 10, wherein storing the first and second data blocks in the blockchain further comprises:
checking whether the identifier of the second node and the identifier of the first node are associated with the target transaction;
checking whether the first piece of encoded transaction data matches the second piece of encoded transaction data; and
in response to the identifier of the second node the identifier of the first node being associated with the target transaction and the first piece of encoded transaction data matching the second piece of encoded transaction data, storing both the first data block and the second data block in the blockchain.

16. A non-transitory computer-readable storage medium storing instructions that when executed by a computer cause the computer to perform a method for processing a transaction based on blockchain, the method comprising:
sending, by a first node associated with the blockchain, a transaction confirmation request for a target transaction to a second node associated with the blockchain, wherein the transaction confirmation request comprises transaction data associated with the target transaction, and wherein the transaction data comprises identifying information of the first node's user associated with the target transaction;
receiving a transaction confirmation response from the second node, wherein the transaction confirmation response comprises a first data block and a first signature, wherein the first data block comprises an identifier of the second node, a first piece of encoded transaction data generated by encoding the transaction data based on a predetermined encoding scheme, and a first confirmation result, wherein the first signature corresponds to a signature computed on the first data block using a private key of the second node, and wherein the first confirmation result indicates approval of the target transaction by the second node based on the identifying information;
generating, by the first node, a second data block comprising at least an identifier of the first node, a second piece of encoded transaction data generated by encoding the transaction data based on the predetermined encoding scheme, and a second confirmation result indicating approval of the target transaction by the first node;
computing, by the first node, a second signature, which is computed on the second data block using a private key of the first node; and
in response to both the first confirmation result and the second confirmation result indicating that the target transaction is confirmed:

storing the first and second data blocks in the blockchain, thereby preventing the transaction data from being leaked to other members in the blockchain; and storing the first and second signatures in the blockchain along with the first and second data blocks, respectively.

17. The non-transitory computer-readable storage medium according to claim 16, wherein the method further comprises:

in response to both the first and second confirmation results indicating that the target transaction is confirmed, processing the target transaction for the blockchain.

18. The non-transitory computer-readable storage medium according to claim 17, wherein processing the target transaction further comprises:

recording result information of the target transaction; and sending the result information to a respective node associated with the target transaction through the blockchain, thereby allowing the node to process the target transaction.

19. The non-transitory computer-readable storage medium according to claim 16, wherein storing the first and second data blocks in the blockchain further comprises:

storing the first data block, the first signature, the second data block, and the second signature in a same block.

20. The non-transitory computer-readable storage medium according to claim 16, wherein the method further comprises verifying the first signature and the second signature.

21. The non-transitory computer-readable storage medium according to claim 16, wherein storing the first and second data blocks in the blockchain further comprises:

checking whether the identifier of the second node and the identifier of the first node are associated with the target transaction;

checking whether the first piece of encoded transaction data matches the second piece of encoded transaction data; and in response to the identifier of the second node and the identifier of the first node being associated with the target transaction, and the first piece of encoded transaction data matching the second encoded piece of transaction data, storing both the first data block and the second data block in the blockchain.

* * * * *